United States Patent
Daly

(10) Patent No.: US 8,532,860 B2
(45) Date of Patent: Sep. 10, 2013

(54) METHODS AND SYSTEMS FOR AUTOMATICALLY YIELDING TO HIGH-PRIORITY TRAFFIC

(75) Inventor: Daniel Daly, Brownsburg, IN (US)

(73) Assignee: Intellibot Robotics LLC, Portland, OR (US)

( * ) Notice: Subject to any disclaimer, the term of this patent is extended or adjusted under 35 U.S.C. 154(b) by 400 days.

(21) Appl. No.: 13/035,487

(22) Filed: Feb. 25, 2011

(65) Prior Publication Data
US 2012/0221174 A1 Aug. 30, 2012

(51) Int. Cl.
*G01C 22/00* (2006.01)
(52) U.S. Cl.
USPC .................................. 701/23; 701/2
(58) Field of Classification Search
USPC ........................................ 701/2, 23
See application file for complete search history.

(56) References Cited

U.S. PATENT DOCUMENTS

| | | | |
|---|---|---|---|
| 6,671,592 B1 * | 12/2003 | Bisset et al. ................... | 701/23 |
| 7,463,948 B2 | 12/2008 | Orita | |
| 2006/0238159 A1 * | 10/2006 | Jung .............................. | 318/587 |
| 2007/0061041 A1 * | 3/2007 | Zweig ........................... | 700/245 |
| 2007/0096676 A1 * | 5/2007 | Im et al. ........................ | 318/587 |
| 2008/0125907 A1 * | 5/2008 | Lee et al. ....................... | 700/245 |
| 2010/0234998 A1 * | 9/2010 | Kim .............................. | 700/259 |
| 2011/0203072 A1 * | 8/2011 | Veenstra ......................... | 15/319 |
| 2012/0287266 A1 * | 11/2012 | Varekamp et al. ............ | 348/135 |

OTHER PUBLICATIONS

Roussos et al., "Decentralized & prioritized Navigation and Collision Avoidance for Multiple Mobile Robots," 10th International symposium on distributed Autonomous Robotics Systems, Nov. 2010.

* cited by examiner

*Primary Examiner* — Hussein A. Elchanti
(74) *Attorney, Agent, or Firm* — Fox Rothschild LLP

(57) ABSTRACT

A method of navigating a mobile robotic device may include receiving, by a mobile robotic device, a wireless transmission from a transponder associated with an object, where the object is within a range of the mobile robotic device and in response to receiving the notification, altering a navigation course by the mobile robotic device to allow the object to pass the mobile robotic device. The mobile robotic device may be preprogrammed with at least a portion of the navigation course. The method may include resuming the navigation course by the mobile robotic device.

19 Claims, 4 Drawing Sheets

METHODS AND SYSTEMS FOR AUTOMATICALLY YIELDING TO HIGH-PRIORITY TRAFFIC

BACKGROUND

Mobile robotic devices have minimized the human effort involved in performing everyday tasks. For example, automatic cleaning devices help maintaining and cleaning surfaces, such as hardwood floors, carpet and the like. Mobile robotic devices often share the pathways in which they navigate with other traffic, such as people, equipment and/or the like. Sometimes, the mobile robot, unaware of the higher priority traffic, prevents or delays the higher-priority traffic from passing.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

In an embodiment, a method of navigating a mobile robotic device may include receiving, by a mobile robotic device, a wireless transmission from a transponder associated with an object, where the object is within a range of the mobile robotic device and in response to receiving the notification, altering a navigation course by the mobile robotic device to allow the object to pass the mobile robotic device. The mobile robotic device may be preprogrammed with at least a portion of the navigation course. The method may include resuming the navigation course by the mobile robotic device.

In an embodiment, a method of navigating a mobile robotic device may include receiving, by a mobile robotic device via a user interface, a notification that an object needs to pass the mobile robotic device, in response to receiving a notification, receiving one or more instructions regarding how to alter a navigation course, automatically altering the navigation course based on the received instructions and resuming the navigation course by the mobile robotic device.

In an embodiment, a method of navigating a plurality of mobile robotic devices may include receiving, by each of a plurality of mobile robotic devices operating in an area, one or more instructions instructing each of the plurality of mobile robotic devices to alter a navigation course associated with the mobile robotic device, in response to receiving one or more instructions, altering, by each of the plurality of mobile robotic devices, the associated navigation course based on the received instructions, and resuming the navigation course by one or more of the plurality of mobile robotic devices.

DETAILED DESCRIPTION

Figure 1:
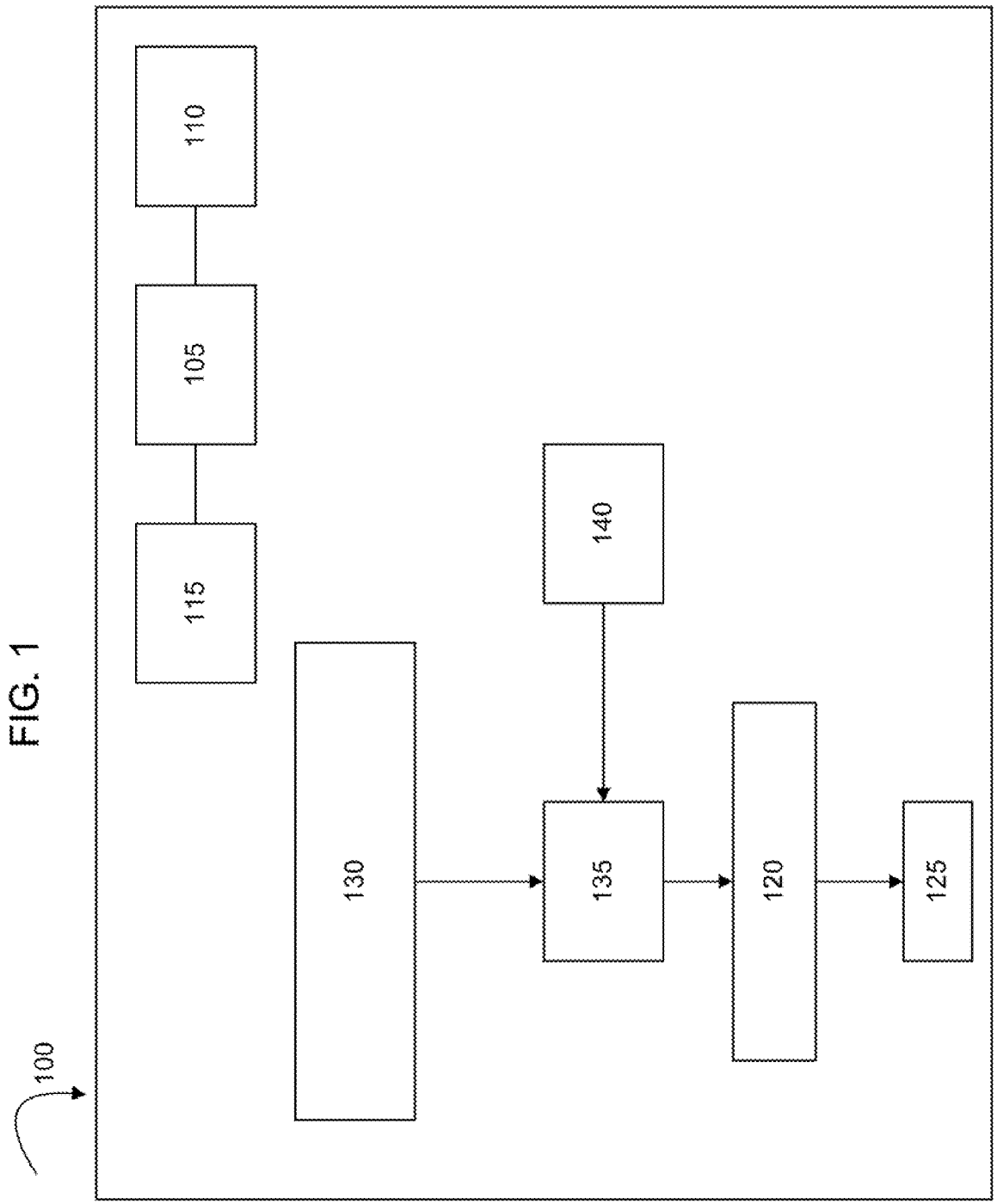
FIG. 1 illustrates an exemplary automatic cleaning device according to an embodiment.

In an embodiment, a mobile robotic device may be an autonomous device that is capable of automatically navigating its environment. FIG. 1 illustrates an exemplary mobile robotic device according to an embodiment. A mobile robotic device 100 may include a processing device 105, a computer-readable storage medium 110 and/or the like. In an embodiment, a mobile robotic device may be in communication with one or more external processing devices, computer-readable storage mediums and/or the like. In an embodiment, a mobile robotic device 100 may include a user interface 115. In an embodiment, a user interface 115 may enable a user to provide one or more instruction to the mobile robotic device 100. The user interface 115 may display information to a user. In an embodiment, the user interface 115 may include one or more buttons, switches and/or the like. For example, the user interface 115 may include a touchscreen display. In an embodiment, a user may provide one or more instructions to a mobile robotic device by pressing, flipping or otherwise selecting one or more buttons, switches and/or the like of the user interface 115.

In an embodiment, a mobile robotic device may include an automatic cleaning device. An automatic cleaning device may be a mobile robotic device that can automatically navigate and clean surfaces, such as floors. FIG. 1 illustrates an exemplary automatic cleaning device according to an embodiment. As shown in FIG. 1, an automatic cleaning device 100 may have one or more cleaning heads 120, and one or more cleaning implements 125, such as but not limited to scrubbers, squeegees, brushes and sponges. In an embodiment, an automatic cleaning device may include a solution tank 130, a pump 135 and a motor 140. The solution tank 130 may store cleaning solution. Cleaning solution may be a liquid used to clean one or more surfaces, such as water, a chemical solution, a combination of water and one or more chemical solutions and/or the like.

In an embodiment, cleaning solution may flow from the solution tank 130 to the pump 135. In an embodiment, cleaning solution may flow from the solution tank 130 to the pump 135 via one or more filters. The cleaning solution may be pumped to the cleaning head 120 where it may be used to clean a surface using one or more cleaning implements 125.

In an embodiment, a mobile robotic device may include a receiver. The receiver may be a computing device with wireless capability, a Bluetooth enabled device, a radio frequency identification enabled device and/or or any other wireless device. In an embodiment, the receiver may receive a wireless transmission from a transponder. A transponder may be a wireless transponder, a computer with wireless capability, a Bluetooth enabled device or any other device capable of transmitting wirelessly. A transponder may be located on an object, such as a piece of equipment and/or the like. In an embodiment, the object may be moveable. For example, an object may be a cart, a gurney, a hospital bed, medical equipment, a wheelchair and/or any other object that has wheels or is otherwise moveable. In an embodiment, a person may be an object. In an embodiment, a transponder may be removably attached to an object.

Figure 2:
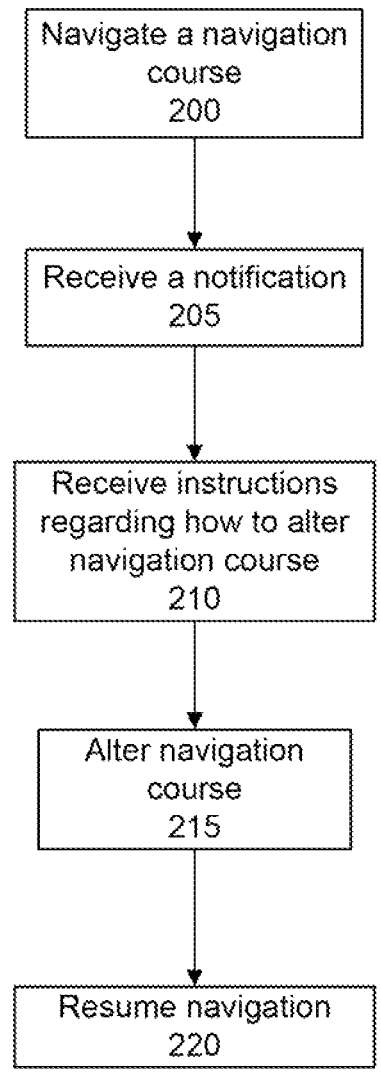
FIG. 2 illustrates an exemplary method of a mobile robotic device yielding the right-of-way to high-priority traffic according to an embodiment.

In an embodiment, an object having a transponder may be considered high-priority traffic. In an embodiment, a mobile robotic device may yield the right-of-way of an area through which it is navigating to high-priority traffic. FIG. 2 illustrates an exemplary method of a mobile robotic device yielding the right-of-way to high-priority traffic according to an embodiment.

As illustrated by FIG. 2, a mobile robotic device may navigate 200 a navigation course. The navigation course may be through an area, such as a hallway, a walkway, a patio, a corridor, a lobby, a building, a building wing, a floor, a room and/or the like.

In an embodiment, a mobile robotic device may be preprogrammed with information associated with at least a portion of the navigation course in an associated computer-readable storage medium or other memory device. For example, a mobile robotic device may store coordinates associated with a navigation course. The mobile robotic device may navigate the course by comparing coordinates associated with its current position to those associated with the navigation course, and moving to the coordinates associated with the navigation course.

In an embodiment, a mobile robotic device may receive information regarding at least a portion of the navigation course from a computing device in communication with the mobile robotic device. For example, a computing device may send a mobile robotic device coordinates associated with the navigation course which the mobile robotic device may use to navigate the course. In an embodiment, a mobile robotic device may receive information regarding at least a portion of a navigation course from a video camera in communication with the mobile robotic device.

In an embodiment, a mobile robotic device may receive 205 a notification alerting the mobile robotic device to the presence of high-priority traffic. In an embodiment, a receiver associated with a mobile robotic device may detect a wireless transmission from a transponder associated with an object. In an embodiment, a receiver may detect a wireless transmission from a transponder when the transponder is within a range of the receiver. For example, a mobile robotic device that is cleaning a hallway in a hospital may detect a wireless transmission from a transponder associated with a gurney that needs to pass the mobile robotic device in the hallway. Although this application discusses the use of a mobile robotic device in a hospital environment, it is understood that the systems and methods described in this application may be used in other environments including, but not limited to, retail environments, airports, warehouses and/or the like.

In an embodiment, a mobile robotic device may detect a wireless transmission from a transponder after a user activates the transponder. For example, a transponder may be located on a gurney that is transporting a patient through a hospital. If a hospital employee such as a doctor, a nurse, a paramedic and/or the like sees a mobile robotic device that the gurney needs to pass, the hospital employee may activate the transponder on the gurney. In an embodiment, a transponder may be activated by pressing a button, switch and/or the like on the transponder.

In an embodiment, a transponder may be activated automatically. For example, a transponder may be automatically activated upon detecting that an object on which it is located has begun moving. In an embodiment, a transponder may be automatically activated at a certain time. In an alternate embodiment, a transponder may be active continuously.

In an embodiment, a mobile robotic device may receive 205 a notification from a user via a user interface of the mobile robotic device. For example, a user may press one or more buttons or switches, or may enter information, such as a code, on one or more user interfaces of a mobile robotic device to notify the mobile robotic device of the presence of high-priority traffic. By way of example, a hospital employee may press a button on a mobile device in advance of high-priority traffic, such as a gurney, reaching the location of the mobile robotic device.

In an embodiment, in response to receiving 205 notification of high-priority traffic, a mobile robotic device may alter 210 its course. In an embodiment, a mobile robotic device may alter its course to allow the high-priority traffic to pass. For example, a mobile robotic device may move to a particular location of the area through which it is navigating, such as a side of a hallway. As another example, a mobile robotic device may stop moving, or may navigate to an out of the way area, such as an alcove, a room and/or the like.

In an embodiment, a mobile robotic device may alter 210 its course based on one or more instructions. In an embodiment, a mobile robotic device may receive one or more instructions from a transponder associated with high-priority traffic. For example, a wireless transmission from a transponder may include one or more instructions that instruct a mobile robotic device how to alter its course. The mobile robotic device may alter its course by navigating in accordance with the one or more instructions.

In an embodiment, a mobile robotic device may receive one or more instructions from a remote computing device. In an alternate embodiment, a mobile robotic device may retrieve one or more instructions from a computer-readable storage medium associated with the mobile robotic device. For example, a mobile robotic device may retrieve one or more instructions from its memory in response to receiving notification of high priority traffic.

In an embodiment, the retrieved instructions may be based on a location of the mobile robotic device when it receives a notification of high priority traffic. For example, a computer-readable storage medium associated with a mobile robotic device may include a database or other lookup table that may store one or more locations and corresponding instructions based on the locations. For instance, if a mobile robotic device is navigating through a hallway when it receives a notification of high priority traffic, it may retrieve one or more instructions associated with the hallway that may instruct the mobile robotic device to move to the right side of the hallway. As another example, if a mobile robotic device is navigating through a recovery room when it receives a notification of high priority traffic, it may retrieve one or more instructions that instruct the mobile robotic device to navigate to a corridor.

In an embodiment, a mobile robotic device may alter 210 its course by determining the location of a nearest wall, and navigating to toward that location. In an embodiment, a mobile robotic device may use information associated with at least a portion of the navigation course that is preprogrammed on the mobile robotic device to determine the location of a nearest wall.

In an embodiment, a mobile robotic device may resume 220 its navigation. In an embodiment, a mobile robotic device may resume 220 its navigation after a time period has passed from when it received 205 a notification. For example, a mobile robotic device may resume 220 its navigation five minutes after receiving a wireless transmission from a transponder. In an embodiment, a mobile robotic device may resume 220 its navigation when it no longer detects a wireless transmission from a transponder. In an embodiment, a mobile robotic device may resume 220 its navigation by returning to the location where the mobile robotic device was positioned when it received 205 a notification. In an embodiment, a mobile robotic device may resume 220 its navigation by returning to a location on its navigation course that is closest to the mobile robotic device's current location.

Figure 3:
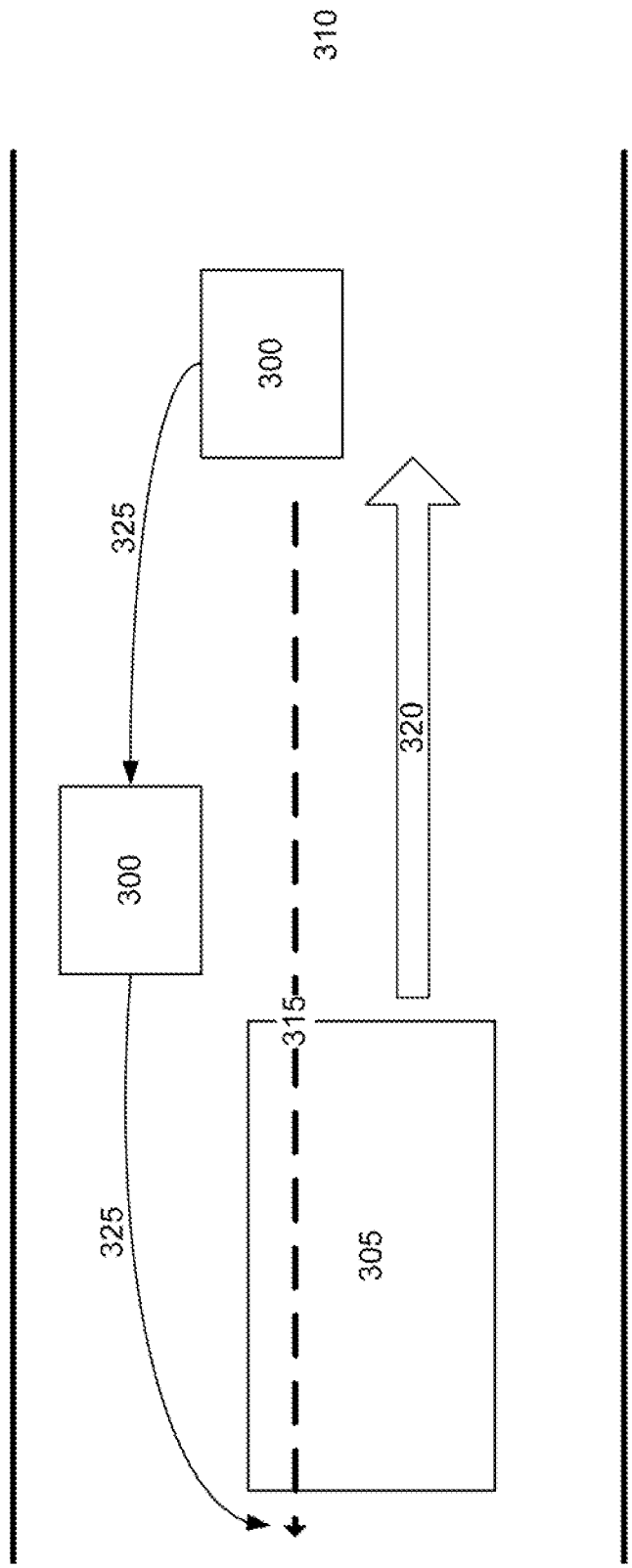
FIG. 3 illustrates an exemplary method of altering the course of a plurality of mobile robotic devices according to an embodiment.

FIG. 3 illustrates an exemplary mobile robotic device yielding right-of-way to high-priority traffic according to an embodiment. As illustrated by FIG. 3, a mobile robotic device 300 and an object 305, such as a gurney, may navigate the same area 310. In an embodiment, the object 305 may be high-priority traffic, and may need to pass the mobile robotic device 300 in the area 310. The mobile robotic device 300 may be traveling in one direction through the area, i.e., from right to left in FIG. 3, and the object 305 may be traveling in an opposition direction through the area, i.e., from left to right in FIG. 3. FIG. 3 illustrates the mobile robotic device's intended navigation course 315 and the object's navigation course 320 according to an embodiment. As illustrated by FIG. 3, unless the mobile robotic device or the object alters its course, the two will collide.

In an embodiment, the mobile robotic device may receive a notification alerting the mobile robotic device to the presence of the object 305. For example, a receiver on the mobile robotic device 300 may detect a transmission from a transponder associated with the object 305. In response to receiving a notification, the mobile robotic device 300 may alter its navigation course. FIG. 3 shows an exemplary altered navigation course 325 according to an embodiment. After the object has passed, the mobile robotic device may resume its navigation course 315.

Figure 4:
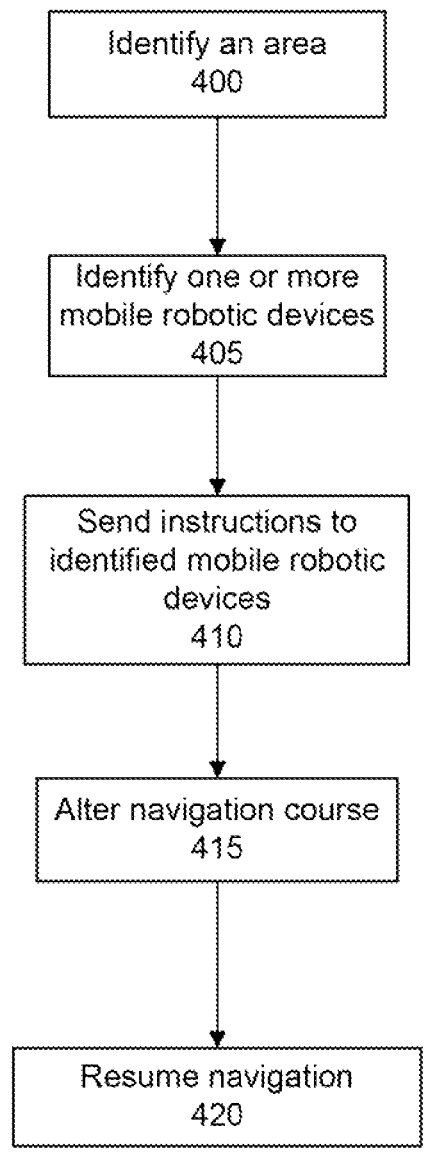
FIG. 4 illustrates an exemplary method of altering the course of a plurality of mobile robotic devices according to an embodiment.

In an embodiment, a plurality of mobile robotic devices in an area may be instructed to alter their navigation. For example, if a fire alarm is activated in a building, all mobile robotic devices operating in the building may be instructed to alter their navigation so that occupants of the building can more easily evacuate the building. As another example, if an emergency room wing of a hospital receives an influx of patients, the mobile robotic devices operating in the wing may be instructed to alter their navigation. FIG. 4 illustrates an exemplary method of altering the course of a plurality of mobile robotic devices according to an embodiment. As illustrated in FIG. 4, an area in which a plurality of mobile robotic devices are operating may be identified 400. For example, a floor of a hospital may be identified 400. In an embodiment, one or more mobile robotic devices operating in the identified area may be identified 405. For example, the mobile robotic devices operating on the identified floor may be identified 405.

In an embodiment, one or more mobile robotic devices operating in an area may be identified 405 by retrieving one or more schedules associated with one or more mobile robotic devices from a database or other computer-readable storage medium. In an embodiment, a schedule may identify a location of one or more mobile robotic devices at a certain time. In an embodiment, one or more mobile robotic devices operating in an area may be identified 405 by sending a request for a location to one or more mobile robotic devices. In response to receiving a request, the one or more mobile robotic devices may each transmit their current locations. The mobile robotic devices that are located in the identified area may be identified 405.

In an embodiment, one or more instructions may be sent 410 to the identified mobile robotic devices. In an embodiment, the one or more instructions may instruct the identified mobile robotic devices to alter their courses. In an embodiment, each identified mobile robotic device may be instructed to alter its course in the same manner. For example, each identified mobile robotic device may be instructed to stop navigation. In an alternate embodiment, one or more of the identified mobile robotic devices may be instructed to alter its course in a different manner. For example, one identified mobile robotic device may be instructed to stop its navigation while another identified mobile robotic device may be instructed to navigate to a certain location in the area.

In an embodiment, each of the identified mobile robotic devices may alter 415 its navigation course in accordance with its corresponding received instructions. For example, if a mobile robotic device receives instructions instructing it to navigate to a lobby area, the mobile robotic device may navigate to the lobby area.

In an embodiment, the identified mobile robotic devices may resume 420 their navigation. In an embodiment, the identified mobile robotic devices may resume 420 their navigation after a time period has passed from when they received instructions. For example, the identified mobile robotic devices may resume 420 their navigation one hour after receiving instructions to alter their navigation. In an embodiment, the identified mobile robotic devices may resume 420 their navigation in response to receiving one or more instructions instructing them to resume navigation. In an embodiment, an identified mobile robotic device may resume 420 its navigation by returning to the location where the identified mobile robotic device was positioned when it received the one or more instructions to alter its course.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of navigating a mobile robotic device, the method comprising:
    receiving, by a mobile robotic device, a wireless transmission from a transponder associated with an object, wherein the object is within a range of the mobile robotic device;
    in response to receiving the notification, altering a navigation course by the mobile robotic device to allow the object to pass the mobile robotic device, wherein the mobile robotic device is preprogrammed with at least a portion of the navigation course; and
    resuming the navigation course by the mobile robotic device.

2. The method of claim 1, wherein receiving a wireless transmission comprises receiving a wireless transmission by a receiver of the mobile robotic device.

3. The method of claim 1, wherein receiving a wireless transmission comprises receiving a wireless transmission from a transponder in response to the transponder being activated.

4. The method of claim 1, wherein altering a navigation course comprises:
    determining a location associated with the mobile robotic device; and
    altering the navigation course associated with the mobile robotic device based on the location.

5. The method of claim 1, wherein altering a navigation course comprises:

receiving one or more instructions that instruct the mobile robotic device how to alter its course.

6. The method of claim 5, wherein receiving one or more instructions comprises receiving one or more instructions from a computer-readable storage medium associated with the mobile robotic device.

7. The method of claim 5, wherein receiving one or more instructions comprises receiving one or more instructions from computing device in communication with the mobile robotic device.

8. The method of claim 5, wherein the wireless transmission comprises one or more instructions that instruct the mobile robotic device how to alter its course.

9. The method of claim 1, wherein resuming the navigation course comprises resuming the navigation course after a period of time has passed from receiving the wireless transmission.

10. The method of claim 1, wherein resuming the navigation course comprises:
   returning, by the mobile robotic device, to a location where the mobile robotic device was when the mobile robotic device received the wireless transmission; and
   continuing, by the mobile robotic device, on the navigation course.

11. The method of claim 1, wherein the mobile robotic device comprises a mobile robotic cleaning device.

12. A method of navigating a mobile robotic device, the method comprising:
   receiving, by a mobile robotic device via a user interface, a notification that an object needs to pass the mobile robotic device;
   in response to receiving a notification, receiving one or more instructions regarding how to alter a navigation course;
   automatically altering the navigation course based on the received instructions; and
   resuming the navigation course by the mobile robotic device.

13. The method of claim 12, wherein receiving one or more instructions comprises receiving one or more instructions from a computer-readable storage medium associated with the mobile robotic device.

14. The method of claim 12, wherein receiving one or more instructions comprises receiving one or more instructions from computing device in communication with the mobile robotic device.

15. The method of claim 12, wherein the notification comprises one or more instructions that instruct the mobile robotic device how to alter its course.

16. A method of navigating a plurality of mobile robotic devices, the method comprising:
   receiving, by each of a plurality of mobile robotic devices operating in an area, one or more instructions instructing each of the plurality of mobile robotic devices to alter a navigation course associated with the mobile robotic device;
   in response to receiving one or more instructions, altering, by each of the plurality of mobile robotic devices, the associated navigation course based on the received instructions; and
   resuming the navigation course by one or more of the plurality of mobile robotic devices.

17. The method of claim 16, further comprising:
   for each of a second plurality of mobile robotic devices, in response to receiving a request from a computing device, sending to the computing device a location associated with the mobile robotic device.

18. The method of claim 16, wherein resuming the navigation course comprises:
   resuming the navigation course by one or more of the plurality of mobile robotic devices in response to receiving, by the one or more of the plurality of mobile robotic devices, one or more instructions from a computing device.

19. The method of claim 16, wherein resuming the navigation course comprises:
   resuming the navigation course by one or more of the plurality of mobile robotic devices after a time period has passed from the one or more mobile robotic devices receiving one or more instructions instructing the one or more mobile robotic devices to alter a navigation course.

* * * * *